United States Patent [19]

Passaretti

[11] Patent Number: 5,043,017

[45] Date of Patent: Aug. 27, 1991

[54] ACID-STABILIZED CALCIUM CARBONATE, PROCESS FOR ITS PRODUCTION AND METHOD FOR ITS USE IN THE MANUFACTURE OF ACIDIC PAPER

[75] Inventor: June D. Passaretti, Liberty Corner, N.J.

[73] Assignee: Pfizer Inc., New York, N.Y.

[21] Appl. No.: 491,366

[22] Filed: Mar. 9, 1990

[51] Int. Cl.⁵ .................................................. C09C 1/02
[52] U.S. Cl. ...................................... 106/465; 106/464; 106/499; 106/400; 106/401
[58] Field of Search .......................... 106/464, 465, 499

[56] References Cited

U.S. PATENT DOCUMENTS

| | | | |
|---|---|---|---|
| 3,704,158 | 11/1972 | Rohan | 106/464 |
| 3,873,336 | 3/1975 | Lambert et al. | 106/214 |
| 4,115,187 | 9/1978 | Davidson | 162/168.7 |
| 4,175,066 | 11/1979 | Shibazaki et al. | 210/701 |
| 4,219,590 | 8/1980 | Shibazaki et al. | 106/419 |
| 4,793,985 | 12/1988 | Price et al. | 106/465 |

Primary Examiner—William R. Dixon, Jr.
Assistant Examiner—Scott L. Hertzog
Attorney, Agent, or Firm—Peter C. Richardson; Lawrence C. Akers; Howard R. Jaeger

[57] ABSTRACT

A form of calcium carbonate, acid-stabilized by the addition to finely divided calcium carbonate of one of a calcium-chelating agent and a conjugate base, such as sodium hexametaphosphate, followed by the addition of a weak acid, such as phosphoric acid, is disclosed. A process for producing this material, and a method for its use in the making of neutral to acidic paper in order to improve the optical properties of the paper are also disclosed.

32 Claims, 4 Drawing Sheets

ACID-STABILIZED CALCIUM CARBONATE, PROCESS FOR ITS PRODUCTION AND METHOD FOR ITS USE IN THE MANUFACTURE OF ACIDIC PAPER

FIELD OF THE INVENTION

This invention relates to an acid-stabilized form of calcium carbonate, a process for producing this material, and to a method for use of the material as a filler material in the making of neutral to weakly acidic paper to improve the optical properties of the resulting paper.

BACKGROUND OF THE INVENTION

Titanium dioxide and calcined clay have traditionally been used as filler materials in the making of neutral to weakly acidic paper, to improve the optical properties of the resulting paper, particularly its brightness. These materials, however, especially titanium dioxide, have the disadvantage of being very expensive, which results in a high cost of manufacturing the paper, and consequently, the need to charge a high, uncompetitive price for such paper.

Calcium carbonate, particularly precipitated calcium carbonate, is used as a filler material in the making of alkaline paper. This material results in a paper with enhanced optical properties. Calcium carbonate is also significantly less expensive than titanium dioxide, consequently there are appreciable economic advantages to its use. Calcium carbonate, however, cannot generally be used as a filler in acidic paper because it decomposes in an acidic environment. Consequently, there has long been a need to develop a calcium carbonate based material which is acid stabilized and resistant to decomposition at low pH, so that it can be used as a filler material in the manufacture of acidic paper, such as groundwood paper, where use of an alkaline filler would have a negative impact on the final paper properties.

Heretofore, the use of various phosphoric acids and their salts, especially their sodium and potassium salts, in processes for the production of calcium carbonate by the carbonation of an aqueous suspension of calcium hydroxide, has been known.

Among the literature disclosing such processes are U.S. Pat. No. 4,240,870 wherein at least one of a phosphoric acid such as orthophosphoric acid, metaphosphoric acid, hexametaphosphoric acid, tripolyphosphoric acid, pyrophosphoric acid, tetrapolyphosphoric acid and hexapolyphosphoric acid, or the sodium, potassium or zinc salts thereof is added to an aqueous calcium hydroxide suspension in the first step of a multi-step calcium carbonate production process. The amount of acid or salt utilized is from about 0.01 to about 5.0 weight percent of the calcium hydroxide in the suspension.

Similarly, in U.S. Pat. No. 4,244,933, the reaction of the first step or the second step of a multi-step calcium carbonate synthesis is carried out in the presence of at least one of a phosphoric acid and a water soluble salt thereof. The phosphoric acid or salt thereof is chosen from among the same list, and utilized in the same amount as given in the '870 patent, above.

U.S. Pat. No. 4,018,877 discloses the addition of a complex-forming agent such as a polyphosphate, particularly sodium hexametaphosphate, during the end of the first carbonation stage of an multi-step calcium carbonate production process, preferably after the bulk of the calcium carbonate precipitation has occurred, or during the subsequent ageing or second carbonation step. The amount of complexing agent used ranges from 0.001 to 5 weight percent of the calcium carbonate produced.

U.S. Pat. No. 4,157,379 similarly discloses the addition of a soluble metal salt such as an alkali metal phosphate, after primary carbonation of an aqueous suspension of calcium hydroxide. The amount of salt added is from about 0.001 to 0.5 mole percent of calcium hydroxide in the starting suspension.

Published Japanese patent Application No. 090,821/60 discloses a process for the preparation of calcium carbonate in which a condensed phosphoric acid or its salt is added to a viscous gelatinous emulsion formed by the carbonation of an aqueous calcium hydroxide dispersion with a carbon dioxide-containing gas. The condensed phosphoric acid may be hexametaphosphoric, pyrophosphoric, tripolyphosphoric, polyphosphoric or ultraphosphoric acid.

Published Japanese Patent Application No. 090,822/60 discloses the same basic process as is disclosed in published Japanese Patent Application No. 090,821/60, above, but further including the presence of a magnesium-containing compound in the aqueous calcium hydroxide dispersion.

In none of the foregoing references, however, is it disclosed or suggested that the phosphoric acid or salt thereof added during preparation of the calcium carbonate has the effect of making the resulting calcium carbonate product acid-resistant. Moreover, in all of the above processes, the acid or salt addition is to the calcium hydroxide suspension prior to or during carbonation or to the calcium carbonate precursor just after precipitation, rather than to the final calcium carbonate particles.

U.S. Pat. No. 4,793,985 discloses the addition of from 0.2 to 0.4 weight percent of a dispersing agent such as water soluble salts of polyphosphoric acid or phosphates, particularly, sodium hexametaphosphate, to a slurry of ground calcium carbonate, in order to improve solids distribution within the liquid, as part of a process for producing an ultrafine calcium carbonate with an average particle size of less than 2 microns.

Although the above reference involves the phosphoric acid or polyphosphate addition to a calcium carbonate, the addition is to the calcium carbonate in slurry form and nothing is disclosed or suggested about the acid or phosphate rendering the resulting ultrafine calcium carbonate acid-resistant.

The use of polyphosphoric acid and polyphosphates as dispersants or surfactants in slurries of mineral particles, such as calcium carbonate, for use in waste treatment, is disclosed in U.S. Pat. No. 4,610,801.

U.S. Pat. No. 4,219,590 discloses the treatment of calcium carbonate particles of not more than 20 microns average particle diameter with an acid gas capable of reacting with the calcium carbonate, such as the acid gas obtained by heating phosphoric acid, in order to finely uniformize the calcium carbonate particle size and coat the particle surface with the calcium salt of the acid gas. This reference further discloses that when the acid gas is hydrogen fluoride, sulfur dioxide, phosphoric anhydride or a chloride or fluoride of titanium, aluminum or silica, the resulting calcium carbonate particles demonstrate reduced solubility in acids. The process is based on a solid-gaseous phase contact in a fluidized bed type reactor. In utilizing a gaseous contact process, the patent suggests, however, that there are inherent drawbacks to utilizing a method wherein surface treatment of the calcium carbonate is effected by treating an aqueous suspension of calcium carbonate with a solution or emulsion of the surface treatment agent.

Japanese Patent No. 030,812/82 discloses a method for improving the surface of calcium carbonate particles using an aqueous solution of a condensed phosphate, only, such as a metaphosphate or pyrophosphate, which is added to an aqueous calcium carbonate suspension. The method gives calcium carbonate particles an acid resistance and reduces the pH of the particles by 0.1–5.0.

SUMMARY OF THE INVENTION

Accordingly, a form of calcium carbonate which is acid-stabilized to enable its use as a filler material in the making of neutral to weakly acidic paper, and a process for producing this acid-stable calcium carbonate, based on the addition of a compound which is a calcium-chelating agent and/or a conjugate base, followed by a weak acid, to finely divided calcium carbonate in a solid-liquid reaction and coating process, have been discovered. A preferred calcium-chelating agent or conjugate base and weak acid pair is sodium hexametaphosphate and phosphoric acid.

The acid-stabilized form of calcium carbonate produced according to the present invention has been found to be particularly effective as a filler material in papermaking in that it produces a paper with enhanced optical properties, especially, improved pigment scattering coefficient, opacity, and brightness. The acid-stabilized calcium carbonate of this invention is also economical and significantly less expensive than previously used titanium dioxide and calcined clay fillers. The material prepared according to this invention is also useful as a pigment in paint.

DETAILED DESCRIPTION OF THE PREFERRED EMBODIMENTS OF THE INVENTION

Figure 1:
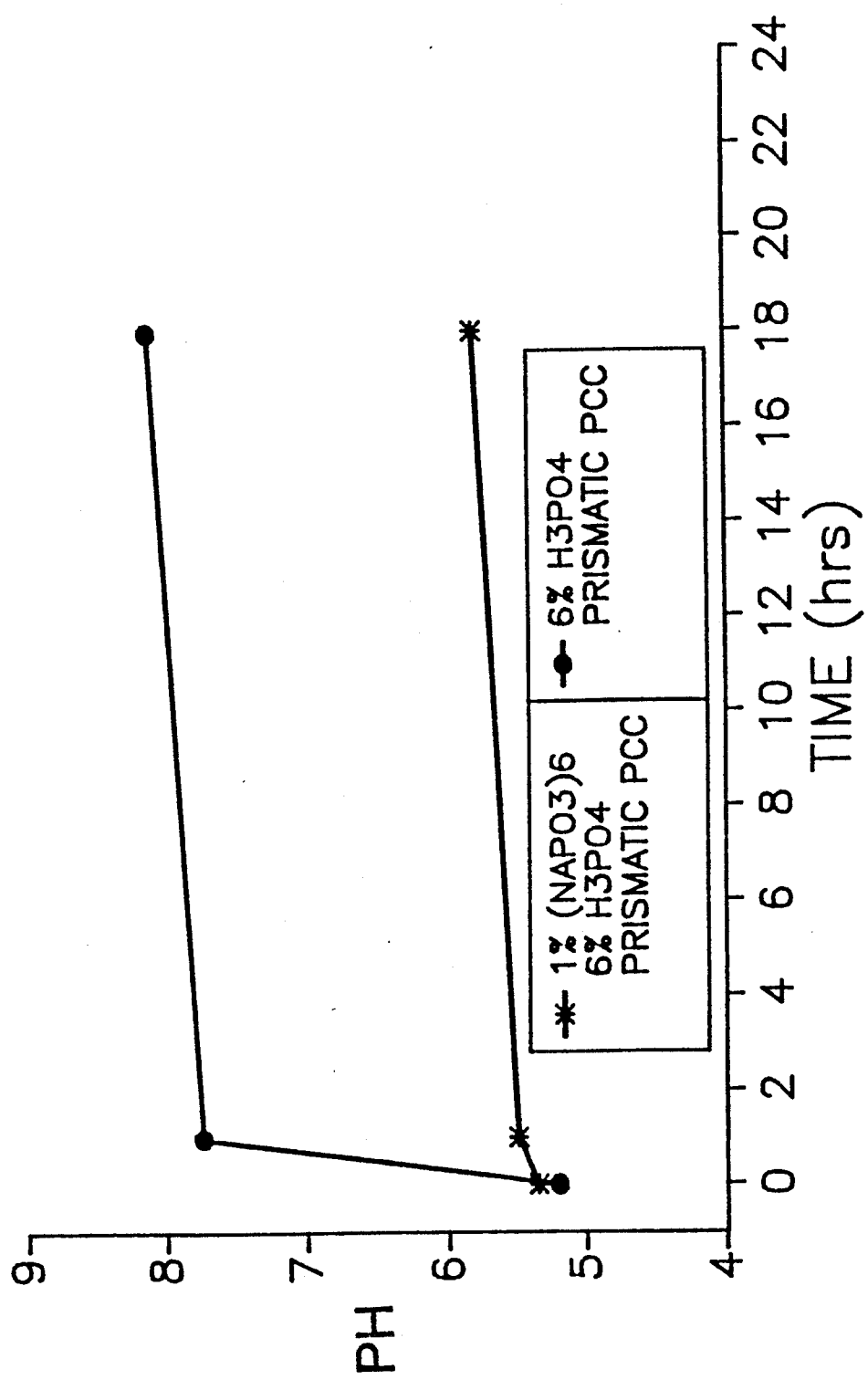
FIG. 1 shows the pH stability over time of precipitated calcium carbonate which has been acid-stabilized with sodium hexametaphosphate and phosphoric acid.

Acid-stable calcium carbonate is a form of calcium carbonate that is stable in a mildly acidic environment. The ability of acid-stable calcium carbonate to resist degradation in a mildly acidic environment is due to a buffering action between an absorbed or reacted calcium-chelating agent or a conjugate base on the surface of the calcium carbonate and a weak acid in solution. Without wishing to be limited to a particular theory, it is believed that the calcium-chelating agent or conjugate base, when applied to the surface of the calcium carbonate, acts to reduce the solubility of the surface of the calcium carbonate.

The anions of the calcium-chelating agent or the conjugate base and the anions of the weak acid, may be the same, although it is not required that they be the same.

For example, when sodium hexametaphosphate is added to calcium carbonate as the conjugate base, the weak acid may be any weak acid such as phosphoric or sulfurous acid, with phosphoric acid being preferred.

The buffered, acid-stable calcium carbonate of the present invention can be any weak acid/conjugate base system, such as citric acid/citrate, sulfurous acid/sulfite, boric acid/borate, and combinations thereof.

According to the present invention, calcium carbonate is acid-stabilized by mixing therewith at least about 0.1 weight percent of a calcium-chelating agent or a conjugate base and at least about 0.1 weight percent of a weak acid. The calcium-chelating agent is a compound selected from the group consisting of sodium hexametaphosphate, which is preferred, and common multi-dentate chelating ligands, including ethylene diamine tetra-acetic acid (EDTA), triethylene tetramine, diethylene triamine, o-phenanthroline, oxalic acid and the like. The conjugate base of the present invention is an alkali metal salt of a weak acid. Preferably, the alkali metal is sodium or calcium. Sodium hexametaphosphate, in addition to being a calcium-chelating agent, is also a conjugate base, and is a preferred example of a conjugate base in the present invention as well. Some embodiments of the weak acid are phosphoric acid, metaphosphoric acid, hexametaphosphoric acid, citric acid, boric acid, sulfurous acid, acetic acid and mixtures thereof. Phosphoric acid is preferred.

Preferably, the calcium-chelating agent or conjugate base is from about 1 to about 2 weight percent of the final mixture, and the weak acid is from about 1 to about 4 weight percent of the final mixture.

The calcium carbonate is preferably finely divided and it can be either a precipitated calcium carbonate or a natural ground limestone.

According to one embodiment of the process of the present invention, the calcium-chelating agent or conjugate base is first mixed with the finely divided calcium carbonate. The weak acid is then added to the mixture and the combined mixture is agitated for a sufficiently long period of time to ensure uniform mixing of the ingredients.

In an alternative embodiment of the process, the calcium-chelating agent or the conjugate base is mixed with the finely divided calcium carbonate. The weak acid is provided in a paper furnish with which the calcium carbonate-containing mixture, as the filler material, is then combined and further mixed during the papermaking process.

In a further alternative embodiment of the process, both the calcium-chelating agent or the conjugate base and the weak acid are provided in a paper furnish which is added to the calcium carbonate during the paper making process.

The components of the acid stabilized calcium carbonate, including the calcium-chelating agent or conjugate base and the weak acid, can be dynamically added to a calcium carbonate-containing paper mixture in a paper making machine as part of a paper furnish, at various times in the course of the papermaking process.

In the embodiment of the process of the present invention wherein both the calcium-chelating agent or conjugate base and weak acid are provided in the paper furnish, it is important that the calcium-chelating agent or conjugate base be sequentially fed to the calcium carbonate-containing mixture before the weak acid.

In all three alternative embodiments, a preferred pair of calcium-chelating agent or conjugate base and weak acid is sodium hexametaphosphate and phosphoric acid.

For any embodiment of the process, the finely divided calcium carbonate may be in a form either as a dry powder or an aqueous slurry with up to about 60 weight percent solids content.

The calcium-chelating agent or conjugate base can be utilized in a form either as a solid or as an aqueous solution. It has been found that when the finely divided calcium carbonate is in dry powder form, it is preferable to utilize an aqueous solution of the calcium-chelating agent or conjugate base, rather than the solid form, in order to facilitate homogeneous mixing. Where the calcium carbonate is in the form of an aqueous slurry, the solid form of the calcium-chelating agent or conjugate base readily dissolves therein and is the preferred form if it is desired to minimize the overall volume of the mixture The weak acids utilizable according to the invention may be utilized in pure concentrated form or as an aqueous solution.

It has been found that, according to the process of the present invention, the level of addition of the calcium-chelating agent or conjugate base needed to acid-stabilize the calcium carbonate is as low as about 0.1 weight percent, on a total final mixture weight basis. A calcium-chelating agent or conjugate base content of from about 1 to about 2 weight percent, on a total final mixture weight basis, is preferred.

Similarly, it has been found that, according to the process of the present invention, the level of weak acid addition needed to stabilize the calcium carbonate is also as low as about 0.1 weight percent, on a total final mixture weight basis. A weak acid content of from about 1 to about 4 weight percent, on a total final mixture weight basis, is preferred.

Where a conjugate base is utilized, the weak acid may be the same acid as the week acid part of the conjugate base or it may be different.

For example, it has been found that a preferred conjugate base/weak acid pair according to the invention is sodium hexametaphosphate and phosphoric acid.

The polyphosphate backbone of the hexametaphosphate exhibits a sequestering action which enables the hexametaphosphate to react with the calcium carbonate surface thereby lowering the solubility of the calcium carbonate. When phosphoric acid is added to calcium carbonate, initially the pH of the slurry is lowered to approximately 5.0. However, within a few minutes of agitation, the pH rises to 8.0. The species that are believed to be formed when the phosphoric acid is added to calcium carbonate are $Ca(H_2PO_4)_2$, $CaHPO_4$ and $Ca_3(PO_4)_2$. These three species are in equilibrium with one another, however, their solubilities decrease in the order $Ca(H_2PO_4) > CaHPO_4 > Ca_3(PO_4)_2$. When $CaHPO_4$ forms, it precipitates out of solution which pushes the equilibrium towards its formation. Eventually all the phosphoric acid is converted to $CaHPO_4$ or $Ca_3(PO_4)_2$, calcium carbonate disassociates and the pH rises. Brushite, $CaHPO_4$, can be detected in the samples via powder x-ray diffraction.

When sodium hexametaphosphate is added to the calcium carbonate slurry, it chelates with the $Ca^{+2}$ that is on the surface of calcium carbonate and in solution. When $H_3PO_4$ is added, it forms $Ca(H_2PO_4)_2$ but the pH of the solution stays acidic due to the $H+$ formed by the hydrolysis of the $(NaPO_3)_6$. As more $CaCO_3$ dissolves, the $Ca^{+2}$ concentration increases to the point where the system reaches equilibrium and no more $CaCO_3$ can disassociate. The equilibrium pH is acidic and is dependant upon the amount of sodium hexametaphosphate and phosphoric acid added.

The above-described three component system consists of calcium carbonate, a calcium-chelating agent or a conjugate base, such as sodium hexametaphosphate, and a weak acid, such as phosphoric acid. Any calcium-chelating agent or conjugate base and weak acid are usable in this system, but sodium hexametaphosphate and phosphoric acid are preferred. Calculations show that theoretically about 0.1 percent of hexametaphosphate is needed per 1 $m^2/g$ of calcium carbonate surface area for complete coverage of the surface, however, in actuality, two to three times the theoretical minimum is necessary for complete coverage, depending on the final amount of weak acid that is added. This is evident in the following examples. As a more practical means of measuring the amounts of hexametaphosphate and phosphoric acid added, however, the amounts typically are expressed as a percent by weight of the dry calcium carbonate.

The nature and scope of the present invention may be more fully understood in view of the following non-limiting examples, which demonstrate the effectiveness of a buffered system using sodium hexametaphosphate and phosphoric acid.

All calcium carbonates utilized in the following examples were precipitated from Pfizer lime from the Adams, Mass. limestone quarry or were undispersed fine ground limestone also from the Adams, MA limestone quarry. All of the precipitated calcium carbonates used in the following examples were prismatic in morphology, with surface area of 7–11 $m^2/g$ and average particle sizes of 0.7 to 1.4 microns. The pH of all precipitated calcium carbonate slurries was adjusted to 8.0 using carbon dioxide.

EXAMPLE 1

Effectiveness of the Buffer System

Previously, there have been some attempts at making calcium carbonate stable in mildly acidic environments by adding a weak acid to calcium carbonate. Initially, the pH of the system may be below 6.0, but with agitation, the pH quickly rises above 8.0. However, when sodium hexametaphosphate is added to the calcium carbonate prior to the addition of phosphoric acid, the pH of the system remains acidic. When 6% of phosphoric acid, based on the dry weight of calcium carbonate, was added to one liter of a 15% solids slurry of precipitated calcium carbonate, the pH initially was reduced to 5.2. When the sample was agitated, the pH of the slurry immediately increased to 8.0. However, when 1% by weight of sodium hexametaphosphate, based on the dry weight of calcium carbonate, was added prior to the phosphoric acid, the pH of the slurry only increased to 5.4 upon agitation. The pH stability of precipitated calcium carbonate with sodium hexametaphosphate and phosphoric acid was compared to the pH stability of precipitated calcium carbonate with phosphoric acid, as shown in FIG. 1.

EXAMPLE 2

Effectiveness of the Buffer System

Figure 2:
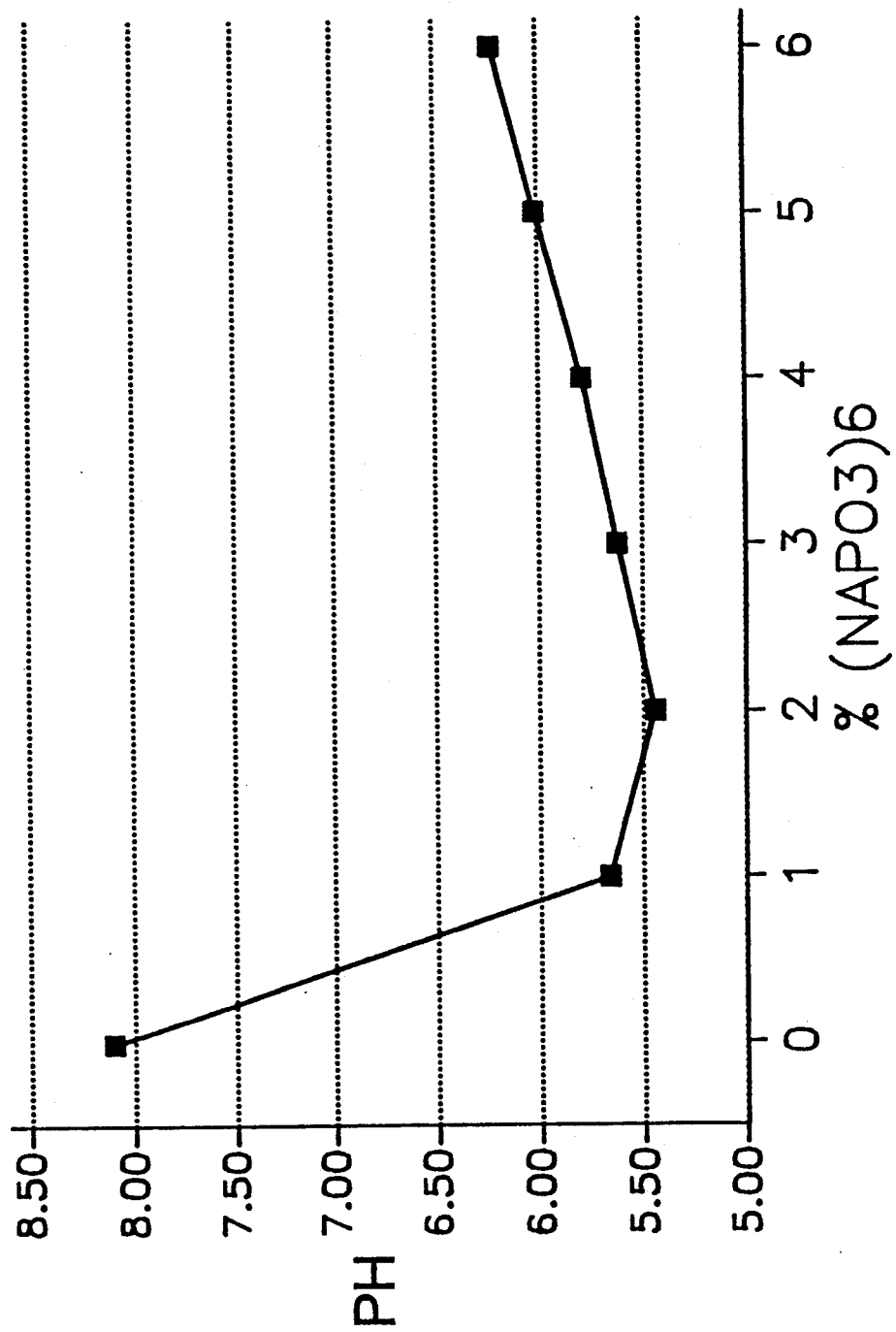
FIG. 2 shows the final pH after extended agitation of precipitated calcium carbonate acid-stabilized with varying levels of sodium hexametaphosphate and 6 weight percent phosphoric acid.

A 15% by weight solids slurry of prismatic calcium carbonate was divided into seven 4-liter portions to which from 0 to 6 percent by weight of sodium hexametaphosphate, based on the dry weight of calcium carbonate, was added in 1 percent increments, followed by the addition of 6% of phosphoric acid, based on the dry weight of calcium carbonate. The materials were then agitated for 18 hours to determine the acid stability. After 18 hours, the samples that had been treated with phosphoric acid only had reached a final pH of 8.2, whereas the samples that had been treated with sodium hexametaphosphate prior to phosphoric acid addition had final pH's below 6.5. This can be seen in FIG. 2.

EXAMPLE 3

Determination of Additive Level

Figure 3:
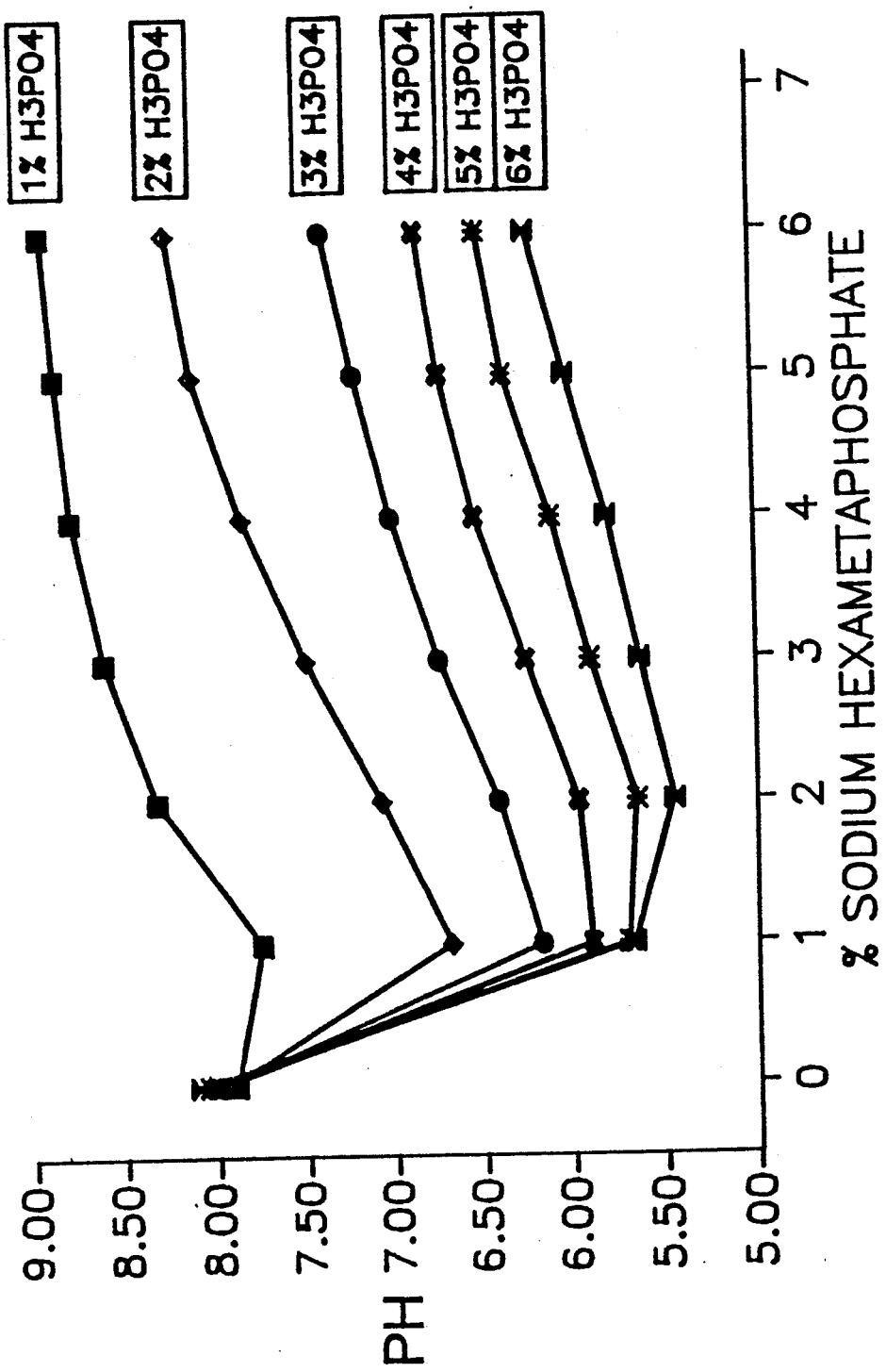
FIG. 3 shows the final pH after extended agitation of precipitated calcium carbonate acid-stabilized with varying levels of sodium hexametaphosphate and phosphoric acid.

To determine the amount of additive necessary to obtain a final acidic pH range, from 0 to 6% of sodium hexametaphosphate, based on the dry weight of calcium carbonate, was added to seven 3000 ml portions of a 15% by weight solids slurry of prismatic calcium carbonate. Each of the 3000 ml portions was then split into six 500 ml aliquots into which from 1-6% of phosphoric acid, based on the dry weight of calcium carbonate, was added in 1 percent increments. The materials were agitated and the pH was measured after 18 hours of agitation. FIG. 3 is a plot of the pH measured for each sample after 18 hours. From FIG. 3, it can be seen that an addition of 2% of sodium hexametaphosphate, based on the dry weight of calcium carbonate, followed by the addition of 6% of phosphoric acid, based on the dry weight of calcium carbonate, resulted in a calcium carbonate slurry that had a stable pH of 5.3. The levels of sodium hexametaphosphate and phosphoric acid required to be added to give a final desired pH are also determinable from FIG. 3.

EXAMPLE 4

Acid Stable Ground Limestone

Figure 4:
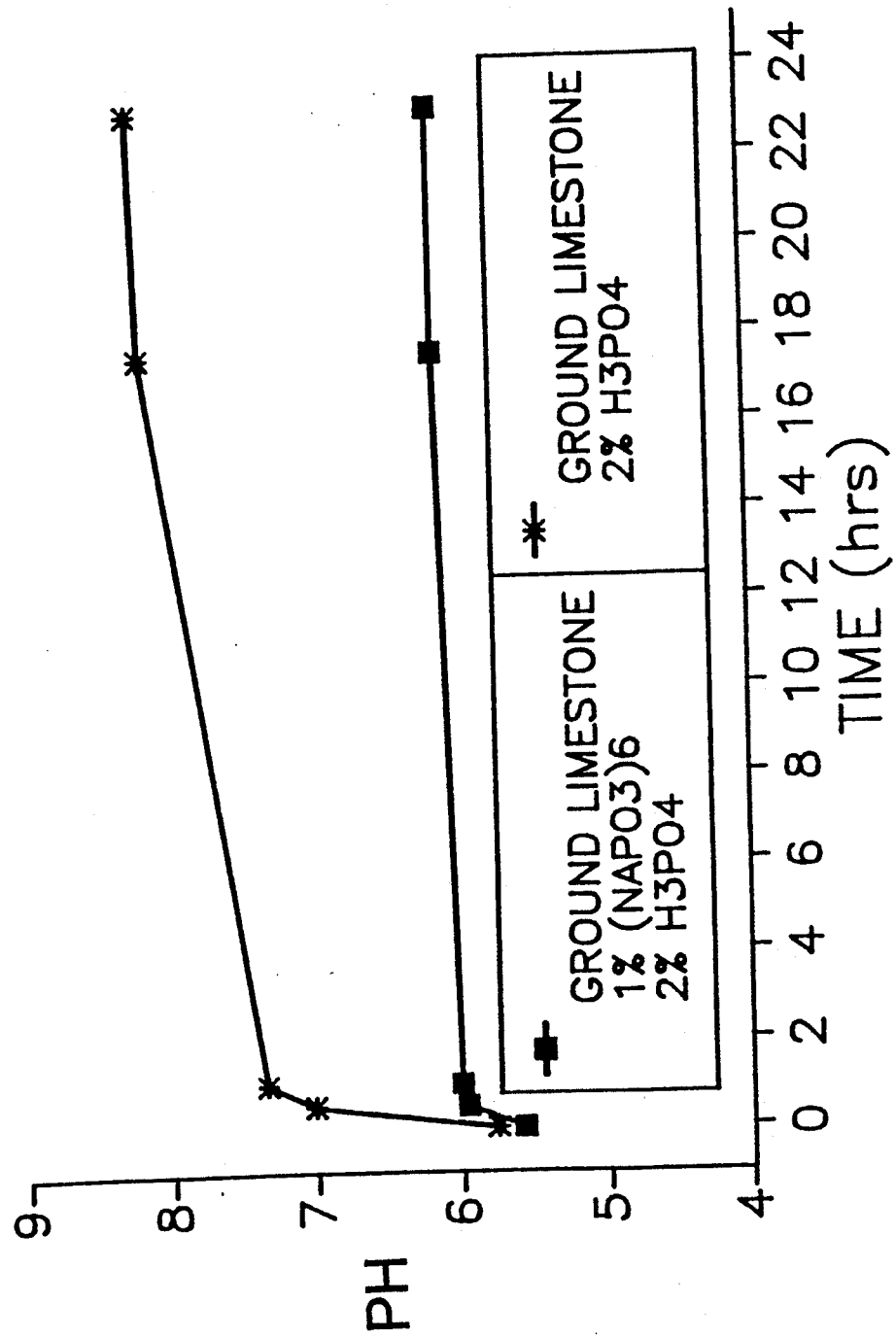
FIG. 4 shows the pH stability over time of calcium carbonate in the form of fine ground limestone which has been acid-stabilized with sodium hexametaphosphate and phosphoric acid and with phosphoric acid only.

Undispersed fine ground limestone from the Pfizer Adams limestone quarry in Mass. was made into a 15% by weight solids slurry. The pH of the slurry was 9.2. To 2000 ml of this slurry, sodium hexametaphosphate was added (1% by weight based on dry calcium carbonate), followed by an addition of phosphoric acid (2% by weight based on dry calcium carbonate). The pH of this slurry, initially and after 24 hours of agitation was compared to the pH of 2000 ml of a 15% by weight solids slurry of the same ground limestone to which 2% of phosphoric acid, based on the dry weight of calcium carbonate, was added. Initially, the pH's of both slurries was 5.5-5.7. However, after 24 hours, the pH of the slurry that was reacted with sodium hexametaphosphate and phosphoric acid was 6.0, whereas the pH of the slurry that had only phosphoric acid addition was 8.0. This is shown in FIG. 4.

What is claimed is:

1. An acid-stabilized finely divided calcium carbonate comprising a mixture of at least about 0.1 weight percent of a compound selected from the group consisting of a calcium-chelating agent and a conjugate base, together with at least about 0.1 weight percent of weak acid, with the balance to give 100 weight percent being finely divided calcium carbonate, such that the calcium carbonate is coated by and is in equilibrum with the calcium-chelating agent or conjugate base and the weak acid.

2. The acid-stabilized finely divided calcium carbonate according to claim 1 wherein the weak acid is selected from the group consisting of phosphoric acid, metaphosphoric acid, hexametaphosphoric acid, citric acid, boric acid, sulfurous acid, acetic acid, and mixtures thereof.

3. The acid-stabilized finely divided calcium carbonate according to claim 1 wherein the conjugate base is an alkali metal salt of a weak acid.

4. The acid-stabilized finely divided calcium carbonate according to claim 3 wherein the alkali metal is sodium or calcium.

5. The acid-stabilized finely divided calcium carbonate according to claim 3 wherein the conjugate base is sodium hexametaphosphate.

6. The acid-stabilized finely divided calcium carbonate according to claim 1 wherein when the conjugate base is selected, the weak acid part thereof and the weak acid are the same or are different and are selected from the group consisting of phosphoric acid, metaphosphoric acid, hexametaphosphoric acid, citric acid, boric acid, sulfurous acid, acetic acid, and mixtures thereof.

7. The acid-stabilized finely divided calcium carbonate according to claim 6 wherein the conjugate base is sodium hexametaphosphate and the weak acid is phosphoric acid.

8. The acid-stabilized finely divided calcium carbonate according to claim 1 wherein the calcium-chelating agent is selected from the group consisting of sodium hexametaphosphate and common multi-dentate chelating ligands.

9. The acid-stabilized finely divided calcium carbonate according to claim 8 wherein the calcium-chelating agent is sodium hexametaphosphate.

10. The acid-stabilized finely divided calcium carbonate according to claim 8 wherein the common multi-denate chelating ligands are selected from the group consisting of include ethylene diamine tetra-acetic acid (EDTA), triethylene, tetramine, diethylene triamine, o-phenanthroline, oxalic acid, and mixtures thereof.

11. The acid-stabilized finely divided calcium carbonate according to claim 2 wherein the weak acid is phosphoric acid.

12. The acid-stabilized, finely divided calcium carbonate according to claim 1 wherein the calcium carbonate is selected from the group consisting of precipitated calcium carbonate and finely ground natural limestone.

13. The acid-stabilized, finely divided calcium carbonate according to claim 1 wherein the calcium-chelating agent or conjugate base is from about 1 to about 2 weight percent of the final mixture.

14. The acid-stabilized finely divided calcium carbonate according to claim 1 wherein the weak acid is from about 1 to about 4 weight percent of the final mixture.

15. A process for producing an acid-stabilized finely divided calcium carbonate comprising the steps of:
   a) forming a mixture by adding to finely divided calcium carbonate, at least about 0.1 weight percent, based on the dry weight of calcium carbonate, of a compound selected from the group consisting of a calcium-chelating agent and a conjugate base;

b) adding at least about 0.1 weight percent of a weak acid, based on the dry weight of calcium carbonate, to the mixture to reduce the pH of the resulting final mixture to from about 5 to about 7; and c) agitating the final mixture to ensure uniform mixing.

16. The process according to claim 15 wherein the weak acid is selected from the group consisting of phosphoric acid, metaphosphoric acid, hexametaphosphoric acid, citric acid, boric acid, sulfurous acid, acetic acid, and mixtures thereof.

17. The process according to claim 15 wherein the calcium-chelating agent is selected from the group consisting of sodium hexametaphosphate and of common multi-dentate chelating ligands.

18. The process according to claim 17 wherein the calcium-chelating agent is sodium hexametaphosphate.

19. The acid-stabilized finely divided calcium carbonate according to claim 8 wherein the common multi-dentate chelating ligands are selected from the group consisting of include ethylene diamine tetra-acetic acid (EDTA), triethylene tetramine, diethylene triamine, o-phenanthroline, oxalic acid, and mixture thereof.

20. The process according to claim 15 wherein the conjugate base is an alkali metal salt of a weak acid.

21. The process according to claim 20 wherein the alkali metal is sodium or calcium.

22. The process according to claim 15 wherein when the conjugate base is selected, the weak acid part thereof and the weak acid are the same or are different and are selected from the group consisting of phosphoric acid, metaphosphoric acid, hexametaphosphoric acid, citric acid, boric acid, sulfurous acid, acetic acid and mixtures thereof.

23. The process according to claim 20 wherein the conjugate base is sodium hexametaphosphate.

24. The process according to claim 22 wherein the conjugate base is sodium hexametaphosphate and the weak acid is phosphoric acid.

25. The process according to claim 15 wherein the finely divided calcium carbonate is selected from the group consisting of a precipitated calcium carbonate and finely ground natural limestone.

26. The process according to claim 15 wherein the finely divided calcium carbonate is in a form selected from the group consisting of a dry powder and an aqueous slurry.

27. The process according to claim 26 wherein when the finely divided calcium carbonate is a dry powder, the calcium-chelating agent or conjugate base is in an aqueous solution and when the finely divided calcium carbonate is an aqueous slurry, the calcium-chelating agent or conjugate base is a solid or is in an aqueous solution.

28. The process according to claim 15 wherein the weak acid is in a form selected from the group consisting of pure liquid acid and an aqueous solution thereof.

29. The process according to claim 15 wherein the calcium-chelating agent or conjugate base is from about 1 to about 2 weight percent of the final mixture.

30. The process according to claim 15 wherein the weak acid is from about 1 to about 4 weight percent of the final mixture.

31. The acid stabilized finely divided calcium carbonate produced according to the process of claim 15.

32. The acid-stabilized finely divided calcium carbonate according to claim 8 wherein the common multi-dentate chelating ligands are selected from the group consisting of include ethylene diamine tetra-acetic acid (EDTA), triethylene tetramine, diethylene triamine, o-phenanthroline, oxalic acid, and mixtures thereof.

* * * * *